United States Patent [19]
Tsai

[11] Patent Number: 5,624,013
[45] Date of Patent: Apr. 29, 1997

[54] AUTOMATIC LOCKING MECHANISM FOR AUTOMATICALLY LOCKING THE TRANSMISSION SHAFT OF AN ELECTRIC HAND TOOL

[75] Inventor: Carl Tsai, Taichung Hsien, Taiwan

[73] Assignee: Collaborative Enterrises, Inc., Glendale, Calif.

[21] Appl. No.: 597,412

[22] Filed: Feb. 8, 1996

[51] Int. Cl.⁶ ................................... F16D 59/00
[52] U.S. Cl. ............... 192/8 R; 188/82.2; 188/82.77
[58] Field of Search .................... 192/8 R, 43.1, 192/148; 188/82.2, 82.7, 82.77

[56] References Cited

U.S. PATENT DOCUMENTS

| | | | |
|---|---|---|---|
| 2,143,121 | 1/1939 | Cox | 192/43.1 |
| 2,744,432 | 5/1956 | Rueb | 192/43.1 X |
| 2,873,832 | 2/1959 | Helm | 192/8 R |
| 3,110,381 | 11/1963 | Leu | 192/8 R |
| 4,235,319 | 11/1980 | Rubianes | 192/8 R |

*Primary Examiner*—Rodney H. Bonck
*Attorney, Agent, or Firm*—Morton J. Rosenberg; David I. Klein

[57] ABSTRACT

A locking mechanism installed in an electric hand tool to automatically lock its lower output shaft including a toothed annular member fixedly mounted inside the shell of the electric hand tool, a holder base mounted inside the annular member, two locking members pivotably mounted in respective holes in the holder base and forced by a spring plate into engagement with the toothed annular member, and a transmission member having a bottom center shaft fitted into the axial center through hole of the holder base, wherein the locking members are forced into engagement with the toothed annular member to prohibit rotary motion of the transmission member relative to the holder base when electricity is cut off; one locking member is forced to disengage from the toothed annular member, when the transmission member is turned in one direction after the connection of electricity to the electric hand drill.

2 Claims, 3 Drawing Sheets

U.S. Patent  Apr. 29, 1997  Sheet 3 of 3  5,624,013
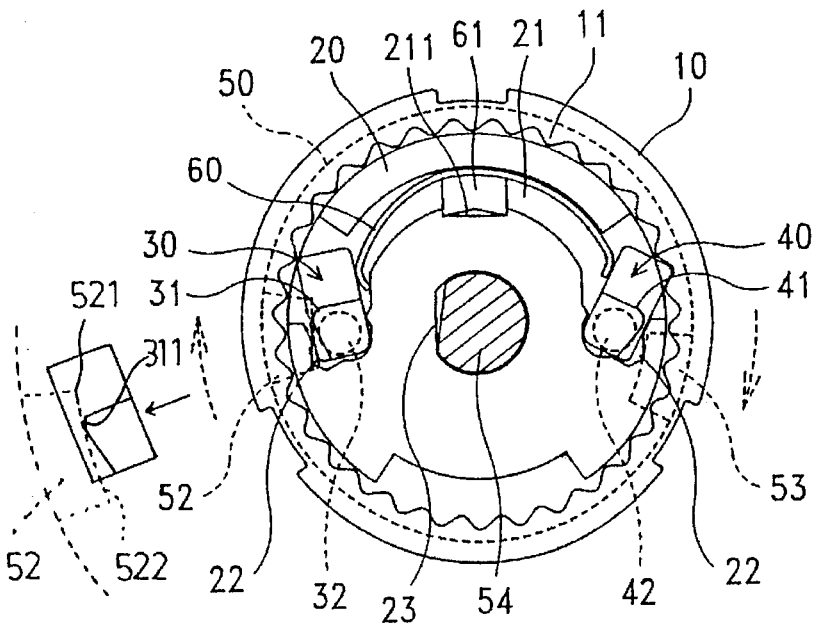
FIG. 4A  FIG. 4
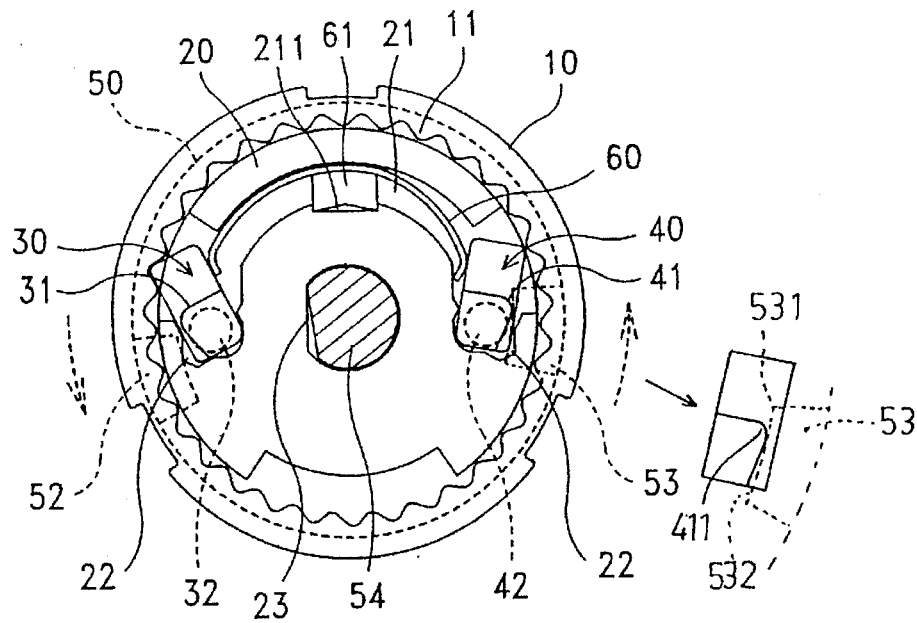
FIG. 5A
FIG. 5

AUTOMATIC LOCKING MECHANISM FOR AUTOMATICALLY LOCKING THE TRANSMISSION SHAFT OF AN ELECTRIC HAND TOOL

BACKGROUND OF THE INVENTION

1. Field of the Invention

This invention relates to electric hand tools, and relates more specifically to the locking mechanism of an electric hand tool which automatically locks the transmission shaft of the electric hand tool when electricity is cut off, thereby enabling the electric hand tool to be operated manually.

2. Description of the Prior Art

When to use an electric hand tool for example for example a hand drill manually, the transmission shaft must be locked. Conventionally, a locking pin is used to lock the transmission shaft. There is known an electric hand tool having an electrically controlled locking mechanism for locking the transmission shaft. However, this electrically controlled locking mechanism is complicated in structure, and wears quickly with use.

SUMMARY OF THE INVENTION

This invention is directed to a locking mechanism of an electric hand tool which automatically locks the transmission shaft of the electric hand tool when electricity is cut off, thereby enabling the electric hand tool to be operated manually. It is one object of the present invention to provide an automatic locking mechanism for electric hand tools which automatically locks the transmission shaft when electricity is cut off. It is another object of the present invention to provide an automatic locking mechanism for electric hand tools which positively locks the transmission shaft when electricity is cut off. It is still another object of the present invention to provide an automatic locking mechanism for electric hand tools which is inexpensive to manufacture and easy to assemble. According to the preferred embodiment of the present invention, an arched spring plate is installed in a holder base inside a toothed annular member, which is mounted inside the shell of the electric hand tool, and two locking plates are mounted in respective recessed holes in the holder base and forced by the spring plate into engagement with the toothed annular member to lock the transmission member, which is coupled to the holder base. One locking plate is disengaged from the toothed annular member when the electric hand tool is electrically operated and turned in one direction, permitting the transmission member to be turned in one direction.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 4 is another top plain view of the locking mechanism, showing the first locking plate disengaged from the annular member, and the transmission member turned clockwise;

FIG. 4A is an enlarged fragmentary view of FIG. 4;

FIG. 5 is still another top plain view of the locking mechanism shown in FIG. 1, showing the second locking plate disengaged from the annular member, and the transmission member turned counter-clockwise; and FIG. 5A is an enlarged fragmentary view of FIG. 5.

DETAILED DESCRIPTION OF THE PREFERRED EMBODIMENT

Figure 1:
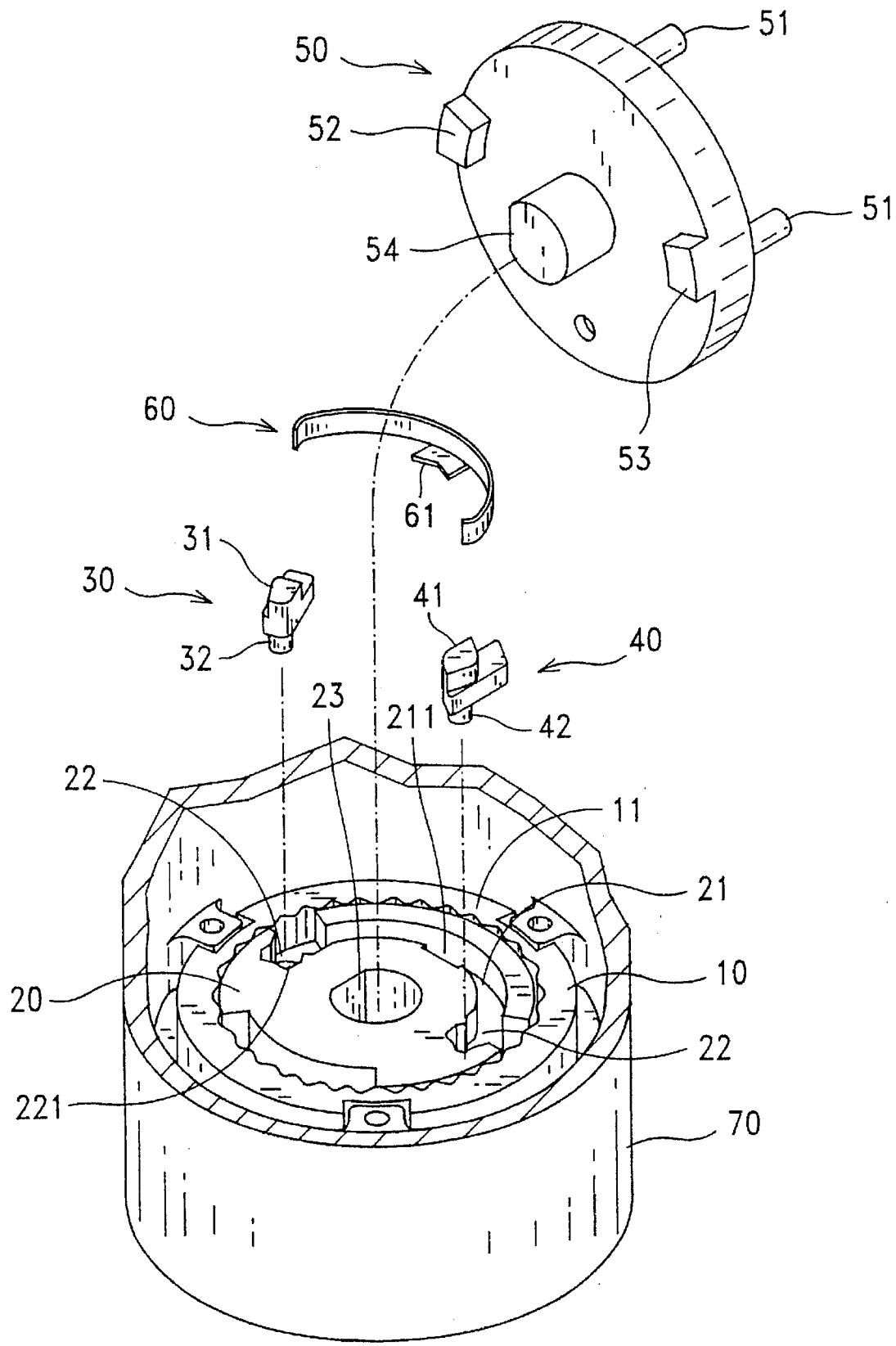
FIG. 1 is an exploded view of the locking mechanism of the preferred embodiment of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figures 2, 2A, 2B:
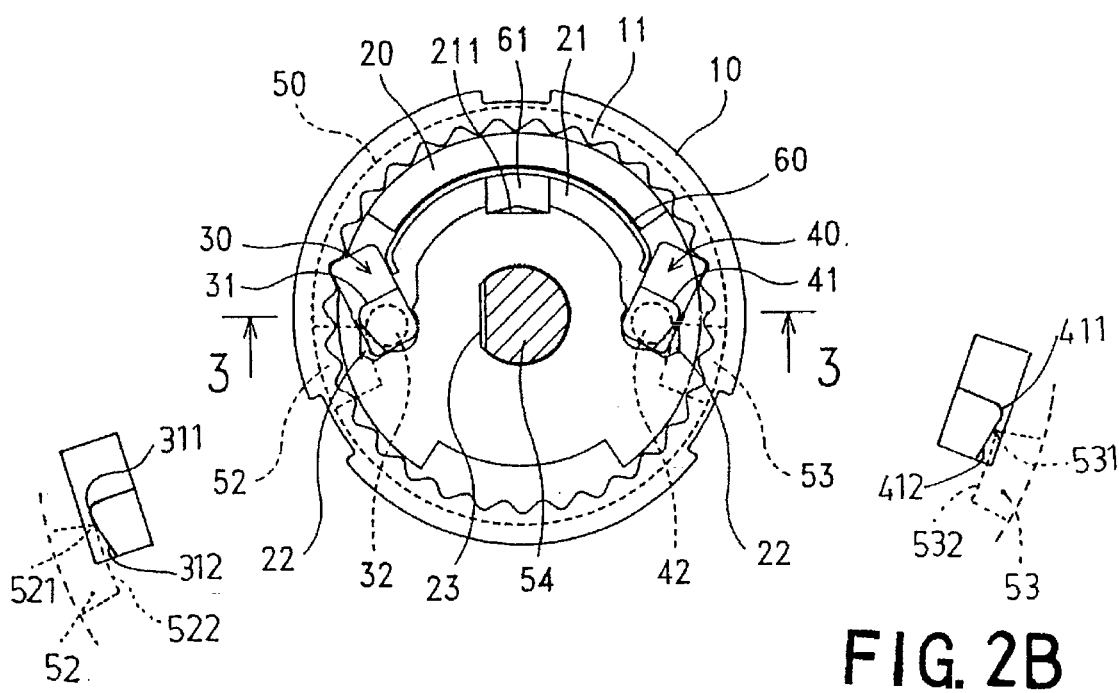
FIG. 2 is top plain view of the locking mechanism shown in FIG. 1, showing the first locking plate and the second locking plate engaged with the annular member, and the transmission member stopped.
FIG. 2A is an enlarged fragmentary view of FIG. 2.
FIG. 2B is another enlarged fragmentary view of FIG. 2.
Figure 3:
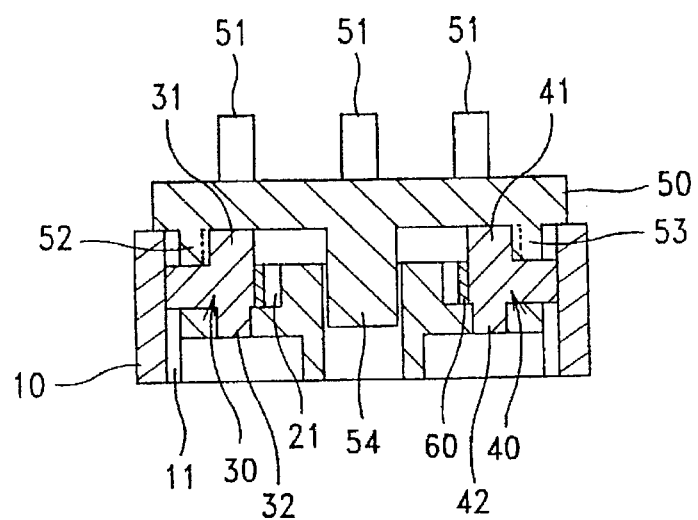
FIG. 3 is a sectional view taken along line 3—3 of FIG. 2.

Referring to FIGS. 1, 2, and 3, an annular member 10 is fixedly mounted inside the shell 70 of an electric hand tool for example a hand drill, having a toothed inner wall 11. A holder base 20 is mounted inside the annular member 10. The holder base 20 comprises an axial center through hole 23 at the center, an arched groove 21 around the axial center through hole 23, two recessed holes 22 at two opposite ends of the arched groove 21, a retaining notch 211 in the middle of the arched groove 21 at an inner side adjacent to the axial center through hole 23, and two pin holes 221 respectively disposed in the recessed holes 22. Two locking plates, namely, the first locking plate 30 and the second locking plate 40 are respectively mounted within the recessed holes 22 of the holder base 20. Each of the locking plates 30, 40 has a pin 32 or 42 at the bottom side inserted into one pin hole 221 of the holder base 20, and a pawl 31 or 41 at the top side. The pawls 31, 41 of the locking plates 30, 40 are disposed in reversed directions. An arched spring plate 60 is mounted within the arched groove 21 of the holder base 20, having a projecting strip 61 in the middle forced into engagement with the retaining notch 211 of the holder base 20. A transmission member 50 is mounted on the holder base 20, having an axle 54 at the center of the bottom side fitted into the axial center through hole 23 of the holder base 20, two locating blocks, namely, the first locating block 52 and the second locating block 53 raised from the bottom side at two opposite locations and aligned with the axle 54, and a plurality of upright coupling rods 51 at the top side coupled to the output end of the motor drive of the electric hand tool. The axial center through hole 23 of the holder base 20 and the axle 54 of the transmission member 50 have the same cross section, which is not circular, however the diameter of the axial center through hole 23 is slightly bigger than that of the axle 54. When the axle 54 is inserted into the axial center through hole 23, it can be turned within only a limited angle.

Referring to FIGS. 1, 2, and 3 again, the pins 32, 42 of the locking plates 31, 41 are respectively inserted into the pin holes 221 of the holder base 20; the arched spring plate 60 is mounted within the arched groove 21 of the holder base 20 and stopped between the locking plates 31, 41 to force the pawls 31, 41 into engagement with the toothed inner wall 11 of the annular member 10; the axle 54 of the transmission member 50 is fitted into the axial center through hole 23 of the holder base 20 and the locating blocks 52, 53 thereof are respectively forced into the recessed holes 22 of the holder base 20 and stopped against the respective outer side walls 312, 412 of the locking plates 30, 40. Under this arrangement, the transmission member 50 is locked, and the electric hand tool can be operated manually.

Referring to FIG. 4, when the electric hand tool is started to turn the transmission member 50 clockwise, the transmission member 50 is turned clockwise through a fixed angle, causing one angle 521 of the first locating block 52 to move over the outer side wall 312 of the pawl 31 of the first locking plate 30. When the first locating block 52 is moved over the outer side wall 312 of the pawl 31 of the first locking plate 30, the first locking plate 30 is forced to rotate in the respective pin hole 221. When the front angle 311 of the pawl 31 is moved to the lateral side 522 of the first locating block 52, the pawl 31 of the first locking plate 30 is disengaged from the toothed inner wall 11 of the annular member 10, and therefore the power output shaft of the electric hand tool is allowed to be turned clockwise.

Referring to FIG. 5, when the transmission member 50 is turned in the counter-clockwise direction, one angle 531 of the second locating block 53 is forced to move over the outer side wall 412 of the pawl 41 of the second locking plate 40. When the second locating block 53 is moved over the outer side wall 412 of the pawl 41 of the second locking plate 40, the second locking plate 40 is forced to rotate in the respective pin hole 221. When the front angle 411 of the pawl 41 is moved to the lateral side 532 of the second locating block 53, the pawl 41 of the second locking plate 40 is disengaged from the toothed inner wall 11 of the annular member 10, and therefore the power output shaft of the electric hand tool is allowed to be turned counter-clockwise.

Referring to FIG. 2 again, when electric power supply is disconnected from the electric hand tool, the transmission member 50 does no work, and the pawls 31, 41 of the locking plates 30, 40 are forced by the arched spring plate 60 into engagement with the toothed inner wall 11 of the annular member 10 to prevent rotary motion of the transmission member 50 relative to the shell 70 of the electric hand tool.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A locking mechanism installed in an electric hand tool to automatically lock its power output shaft, the locking mechanism comprising:

an annular member fixedly mounted inside a shell of the electric hand tool, having a toothed inner wall;

a holder base mounted inside said annular member, having axial center through hole, an arched groove around said axial center through hole, a first recessed hole and a second recessed hole respectively disposed at two opposite ends of said arched groove, a retaining notch in the middle of said arched groove at an inner side adjacent to said axial center through hole, a first pin hole and a second pin hole respectively disposed in said first recessed hole and said second recessed hole;

an arched spring plate mounted in said arched groove of said holder base, having a projecting strip in the middle forced into engagement with the retaining notch of said holder base;

a first locking plate and a second locking plate respectively mounted in said first recessed hole and said second recessed hole of said holder base and stopped at two opposite ends of said arched spring plate, said first locking plate having a bottom pin inserted into the first pin hole of said holder base and a pawl forced by said arched spring plate into engagement with the toothed inner wall of said annular member, said second locking plate having a bottom pin inserted into the second in hole of said holder base and a pawl forced by said arched spring plate into engagement with the toothed inner wall of said annular member; and a transmission member mounted on said holder base and coupled to a power output end of the electric hand tool, having a bottom side, an axle perpendicularly raised from the center of the bottom side and inserted into the axial center through hole of said holder base, a first locating block and a second locating block raised from the bottom side at two opposite locations, said first locating block and said second locating block being respectively received in the first recessed hole and second recessed hole of said holder base and stopped against said first locking plate and said locking plate;

wherein the pawls of said first locking plate and said second locking plate are forced by said arched spring plate into engagement with the toothed inner wall of said annular member to stop rotary motion of said transmission member relative to said annular member when electric power supply is disconnected from the electric hand tool; the pawl of said first locking member is forced away from the toothed inner wall of said annular member by said first locating block and the pawl of said second locking member is forced into engagement with the toothed inner wall of said annular member by said second locating block when said transmission member is turned by the power output end of the electric hand tool clockwise; the pawl of said second locking member is forced away from the toothed inner wall of said annular member by said second locating block and the pawl of said first locking member is forced into engagement with the toothed inner wall of said annular member by said first locating block when said transmission member is turned by the power output end of the electric hand tool counter-clockwise.

2. The locking mechanism as claimed in claim 1 wherein said transmission member has a plurality of equiangularly spaced coupling rods raised from a top side thereof around the border for power transmission.

* * * * *

UNITED STATES PATENT AND TRADEMARK OFFICE
CERTIFICATE OF CORRECTION

PATENT NO. : 5,624,013
DATED : APRIL 29, 1997
INVENTOR(S) : CARL TSAI

It is certified that error appears in the above-identified patent and that said Letters Patent is hereby corrected as shown below:

On the title page, item [73]:
DELETE THE WORDS "Collaborative Enterrises, Inc., Glendale, Calif." AND INSERT THE PROPER ASSIGNEE
--REGITAR POWER TOOLS CO., LTD.
  TAICHUNG HSIEN, TAIWAN, R.O.C.--

Signed and Sealed this

Seventeenth Day of March, 1998

Attest:

BRUCE LEHMAN

*Attesting Officer*     *Commissioner of Patents and Trademarks*